United States Patent
Nomoto

(10) Patent No.: US 11,686,996 B2
(45) Date of Patent: Jun. 27, 2023

(54) LIGHT SOURCE APPARATUS AND IMAGE PROJECTION APPARATUS

(71) Applicant: CANON KABUSHIKI KAISHA, Tokyo (JP)

(72) Inventor: Makoto Nomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/368,975

(22) Filed: Jul. 7, 2021

(65) Prior Publication Data

US 2022/0019136 A1 Jan. 20, 2022

(30) Foreign Application Priority Data

Jul. 17, 2020 (JP) .............................. JP2020-122866

(51) Int. Cl.
*G03B 21/16* (2006.01)
*G03B 21/20* (2006.01)
*F21V 29/60* (2015.01)

(52) U.S. Cl.
CPC .............. *G03B 21/16* (2013.01); *F21V 29/60* (2015.01); *G03B 21/204* (2013.01); *G03B 21/2013* (2013.01)

(58) Field of Classification Search
CPC .. G03B 21/16; G03B 21/2013; G03B 21/204; F21V 29/60
See application file for complete search history.

(56) References Cited

U.S. PATENT DOCUMENTS

| | | | | |
|---|---|---|---|---|
| 2004/0246447 A1* | 12/2004 | Shiraishi | ................ | G03B 21/16 353/58 |
| 2010/0045941 A1* | 2/2010 | Chen | ...................... | G03B 21/16 353/61 |
| 2014/0307232 A1* | 10/2014 | Sato | ..................... | G03B 21/204 353/121 |
| 2015/0131062 A1* | 5/2015 | Nishimori | ............ | G03B 21/145 353/84 |
| 2017/0261844 A1* | 9/2017 | Kitade | ................. | H04N 9/3158 |

FOREIGN PATENT DOCUMENTS

| | | |
|---|---|---|
| JP | 5354288 B2 | 11/2013 |
| JP | 2014206581 A | 10/2014 |
| JP | 2017147420 A | 8/2017 |
| JP | 2020052078 A | 4/2020 |

* cited by examiner

*Primary Examiner* — Evan P Dzierzynski
*Assistant Examiner* — Nathaniel J Lee
(74) *Attorney, Agent, or Firm* — Rossi, Kimms & McDowell LLP

(57) ABSTRACT

A light source apparatus includes a light source, a first heat radiation unit configured to radiate heat from the light source, a wavelength conversion element configured to convert the light from the light source into light with a different wavelength, and a second heat radiation unit configured to radiate heat from the wavelength conversion element. The light source and the wavelength conversion element are disposed opposite to each other. A flowing direction of first cooling air flowing through the first heat radiation unit and a flowing direction of second cooling air flowing through the second heat radiation unit are same direction to each other.

14 Claims, 7 Drawing Sheets

LIGHT SOURCE APPARATUS AND IMAGE PROJECTION APPARATUS

BACKGROUND OF THE INVENTION

Field of the Invention

The present invention relates to an image projection apparatus suitable for an image projection apparatus (projector).

Description of the Related Art

One light source apparatus for a projector uses a device that irradiates a wavelength conversion element, such as a fluorescent element, with excitation light from a solid state light source, such as a laser beam source, to generate converted light (fluorescent light) having a wavelength different from that of the excitation light. This light source apparatus needs to cool the solid state light source and the wavelength conversion element. Japanese Patent No. 5354288 discloses a projector that introduces cooling air (outside air) flowing in different directions to a heat sink provided for each of two light sources.

The projector disclosed in Japanese Patent No. 5354288 disposes a guide plate for controlling the airflow in the airflow path, but this member also serves as a flow path resistor to reduce the cooling performance.

SUMMARY OF THE INVENTION

The present invention provides a light source apparatus having an improved cooling performance for a light source and a wavelength conversion element, and a projector using the same.

A light source apparatus according to one aspect of the present invention includes a light source, a first heat radiation unit configured to radiate heat from the light source, a wavelength conversion element configured to convert the light from the light source into light with a different wavelength, and a second heat radiation unit configured to radiate heat from the wavelength conversion element. The light source and the wavelength conversion body are disposed opposite to each other. A flowing direction of first cooling air flowing through the first heat radiation unit and a flowing direction of second cooling air flowing through the second heat radiation unit are same direction to each other. An image pickup apparatus having the above light source apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
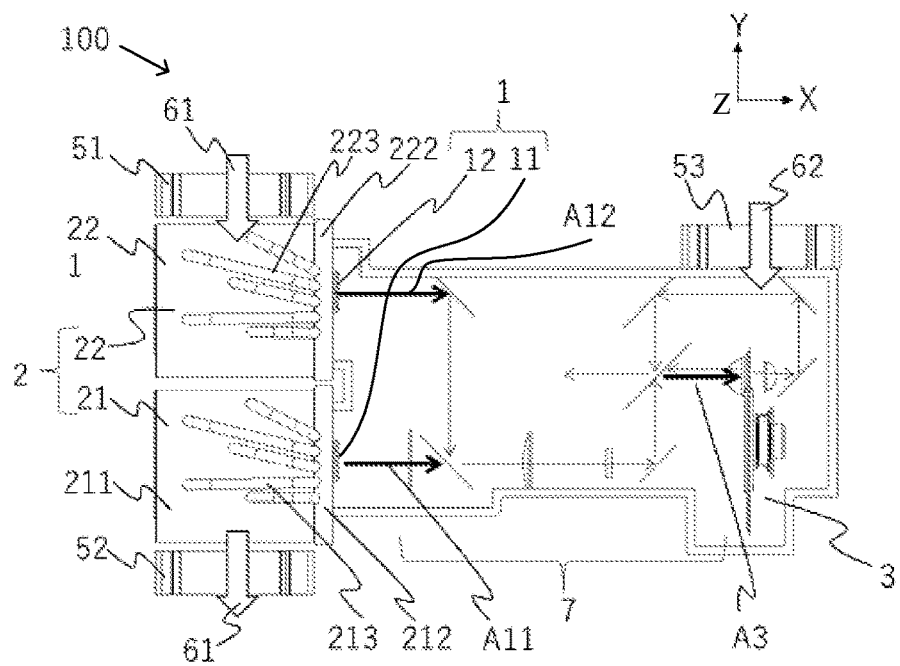
FIG. 1 is a plan view showing an internal structure of a light source unit according to a first embodiment.
Figure 2:
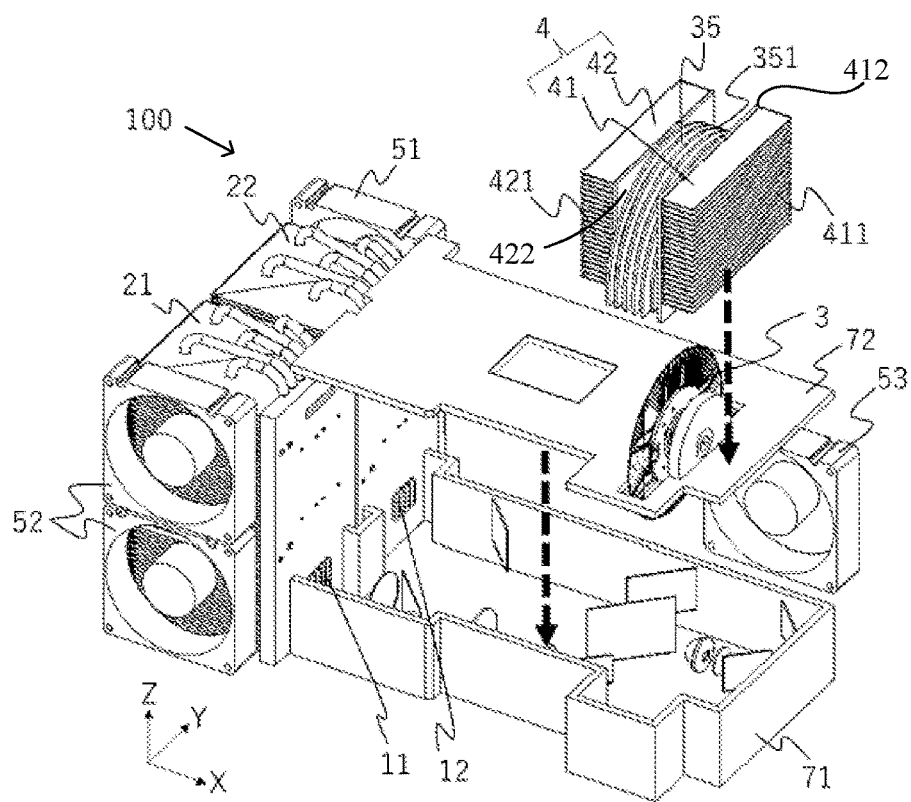
FIG. 2 is an exploded perspective view showing the configuration of the light source unit according to the first embodiment.

FIG. 1 illustrates an internal configuration of a light source unit (light source apparatus) 100 according to a first embodiment of the present invention. FIG. 2 illustrates the light source unit 100 in an exploded manner. The light source unit 100 includes a solid state light source 1, a light source heat sink 2 serving as a first heat radiation unit, a fluorescent body (phosphor) unit 3 having a fluorescent body as a wavelength conversion body (wavelength conversion element), and a fluorescent body (phosphor) heat sink 4 as a second heat radiation unit.

The solid state light source 1 has a first light source 11 and a second light source 12, each including a plurality of semiconductor laser elements (LDs) each of which emits a laser beam. The first and second light sources 11 and 12 are disposed so as to emit the laser beam which is blue light from the light emitting surface in the emission directions (+X direction) indicated by arrows A11 and A12, respectively.

A light source heat sink 2 (21, 22) for cooling the first and second light sources 11 and 12 is disposed on the opposite side (−X side) to the light emitting surface of the first and second light sources 11 and 12. The light source heat sinks 21 and 22 are each made of a material having high thermal conductivity such as aluminum, and include a plurality of fins 211 and 221 arranged in the Z direction (first direction), plate-shaped bases 212 and 222 extending in the Y direction (second direction) and configured to hold fins 211 and 221, and heat pipes 213 and 223. The light source heat sinks 21 and 22 radiate the heat transferred from the first and second light sources 11 and 12, respectively.

A heat conductive member (heat conductive grease or the like) is disposed between the first and second light sources 11 and 12 and the bases 212 and 222 of the light source heat sinks 21 and 22. The light source heat sinks 21 and 22 efficiently radiate the heat transferred from the first and second light sources 11 and 12 to the bases 212 and 222 when cooling air flows between the plurality of fins 211 and 221. FIG. 1 illustrates the flowing direction (−Y direction) of the first cooling air flowing through the light source heat sinks 21 and 22 by arrows 61. The plurality of fins 211 and 221 in the light source heat sinks 21 and 22 are disposed so that their arrangement direction (Z direction) is orthogonal to the flowing direction 61 of the first cooling air. That is, the bases 212 and 222 of the light source heat sinks 21 and 22 are disposed so as to extend parallel to the flowing direction 61 of the first cooling air.

A first intake fan 51 is disposed on the upstream side of the light source heat sink 2 in the flowing direction 61 of the first cooling air, and a first exhaust fan 52 is disposed on the downstream side of it. A duct structure is formed by disposing the light source heat sinks 21 and 22 between the first intake fan 51 and the second exhaust fan 52. This duct structure can increase a flow rate of the first cooling air flowing along the fins 211 and 221 of the light source heat sink 2, and improve the cooling capacity. Since it can increase the heat radiation area of the fins 211 and 221, a sufficient flow rate can be secured even when a distance between the fins becomes narrow or a distance through which the first cooling air flows along the fins becomes long. Therefore, the cooling capacity can be improved.

This embodiment sets to a right angle a first angle formed by the flowing direction 61 of the first cooling air and the emission direction A11 of the laser beam from the first light source 11. However, the right angle, as used herein, does not have to be exactly 90°, and covers an angle close to 90° (such as 80° to 100°). The first angle may be different from this right angle.

The laser beams emitted from the first and second light sources 11 and 12 enter the fluorescent body described later in the fluorescent body unit 3 from the incident direction indicated by the arrow A3 via the optical system 7 including a mirror, a lens, and the like. The emission directions A11 and A12 of the laser beams from the first light sources 11 and 12 and the incident direction A3 of the laser beam on the fluorescent body are parallel to each other. That is, (light emitting surfaces of) the first and second light sources 11 and 12 are opposite to the fluorescent body (light receiving surface of) in the fluorescent body unit 3. In other words, the first and second light sources 11 and 12 and the fluorescent body are disposed so as to face each other.

Figure 3:
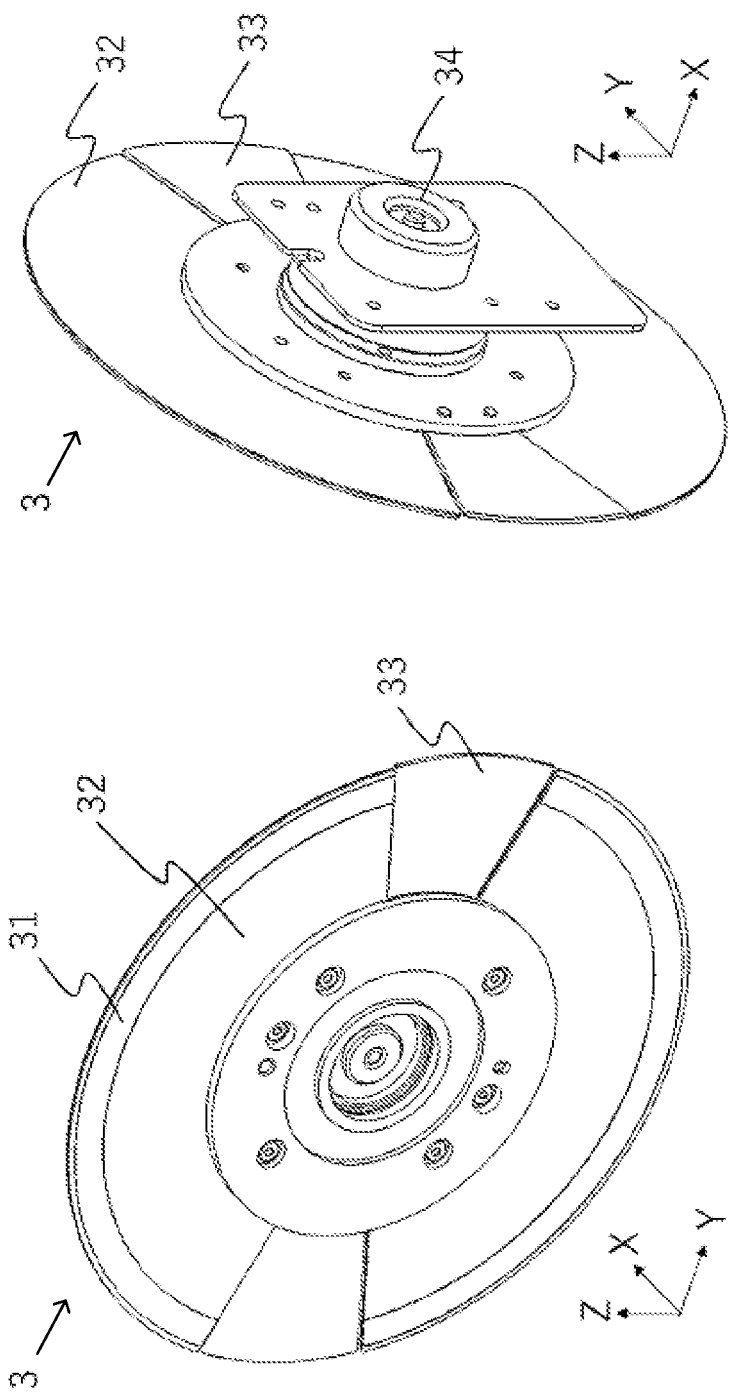
FIG. 3 is a perspective view showing a configuration of a fluorescent body (phosphor) unit in the light source unit according to the first embodiment.

FIG. 3 illustrates the configuration of the fluorescent body unit 3. The fluorescent body unit 3 includes a wheel 32 as a substrate, fluorescent bodies (phosphors) 31 coated on the wheel 32 in an arc shape (held by the wheel 32), and light transmissive members 33 provided at two locations that are not coated with the fluorescent bodies 31 in a circumferential range of the wheel 32. The wheel 32, the fluorescent bodies 31, and the light transmissive members 33 constitute a fluorescent body wheel as a wavelength conversion member. The fluorescent body wheel (31 to 33) are rotated by a motor 34. As illustrated in FIG. 1, the fluorescent body unit 3 is fixed to a lid member 72 of an optical system box 71 that houses and holds the optical system 7, and is covered with a fluorescent body case 35 as a cover member.

When receiving blue light as excitation light, the fluorescent body 31 converts it into fluorescent light (converted light) as yellow light having a different wavelength. The wheel 32 is made of a material having a high reflectance such as an aluminum material. The light transmissive member 33 diffuses and transmits the blue light from the first and second light sources 11 and 12.

The motor 34 prevents the fluorescence conversion efficiency from lowering due to the excitation light entering only part of the fluorescent body 31 and the temperature rise of the part, and rotates the fluorescent body wheel so that the fluorescent body member 33 transmits the blue light that is not converted into the fluorescent light.

The fluorescent body case 35 is made of an aluminum material or the like having high thermal conductivity, and covers the fluorescent body unit 3 (excluding part of the motor 34) fixed to the lid member 72 as described above. Thereby, the first and second light sources 11 and 12, the optical system 7, and the fluorescent body unit 3 are disposed in a substantially enclosed space formed by the optical system box 71, the lid member 72, and the fluorescent body case 35, and foreign matters such as dust are prevented from adhering to the first and second light sources 11 and 12, the optical system 7, and the fluorescent body unit 3.

The yellow light emitted (reflected) from the fluorescent body wheel and the blue light transmitted through the fluorescent body wheel are emitted from the light source unit 100.

As illustrated in FIG. 2, a fluorescent body heat sink 4 (41, 42) is disposed on both sides of the fluorescent body case 35, and serves as a second heat radiation unit configured to indirectly cool the fluorescent body 31 by cooling air inside the fluorescent body case 35. The fluorescent body heat sink 41 is disposed on the back surface side of the fluorescent body wheel, and the fluorescent body heat sink 42 is disposed on the light receiving surface side of the fluorescent body wheel. The fluorescent body heat sinks 41 and 42 are made of a material having high thermal conductivity such as an aluminum material, respectively, and have a plurality of fins 411 and 421 arranged in the Z direction and plate-shaped bases 412 and 422 extending in the Y direction and configured to hold the fins 411 and 421. The fluorescent body heat sinks 41 and 42 radiate the heat transferred from the fluorescent body unit 3 (fluorescent body 31 and wheel 32).

A heat conductive member (heat conductive grease or the like) is disposed between the fluorescent body case 35 and the bases 412 and 422 of the fluorescent body heat sinks 41 and 42. The fluorescent body heat sinks 41 and 42 efficiently radiate the heat transferred from the fluorescent body case 35 (that is, the fluorescent body wheel) to the bases 412 and 422 using the cooling air flowing through the plurality of fins 411 and 421. In FIG. 1, the flowing direction (−Y direction) of the second cooling air flowing through the fluorescent body heat sinks 41 and 42 is indicated by an arrow 62. The second cooling air flowing direction 62 is parallel to the first cooling air flowing direction 61.

The plurality of fins 411 and 421 of the fluorescent body heat sinks 41 and 42 are disposed so that their arrangement direction (Z direction) is orthogonal to the flowing direction 62 of the second cooling air. That is, the bases 412 and 422 of the fluorescent body heat sinks 41 and 42 are disposed so as to extend parallel to the flowing direction 62 of the second cooling air. This embodiment forms the fluorescent body heat sinks 41 and 42 as separate members from the fluorescent body case 35, but they may be integrated with each other.

A second intake fan 53 is disposed on the upstream side of the fluorescent body heat sink 4 in the flowing direction 62 of the second cooling air. The second intake fan 53 disposed on the upstream side of the fluorescent body heat sink 4 can efficiently introduce the second cooling air to the fins 411 and 421 of the fluorescent body heat sink 4, and improve the cooling performance for the fluorescent body unit 3.

In this embodiment, the second angle formed by the flowing direction 62 of the second cooling air and the incident direction A3 (+X direction) of the excitation light on the fluorescent body wheel is a right angle, which is equal to the first angle described above. The right angle as the second angle does not have to be exactly 90°, and covers an angle close to 90° (such as 80° to 100°). The second angle may be an angle different from this right angle.

Introducing the second cooling air to the fluorescent body heat sink 4 disposed in a wide range along the light receiving surface and the back surface of the fluorescent body wheel in the fluorescent body case 35 can improve the cooling efficiency for the fluorescent body unit 3.

Figure 4:
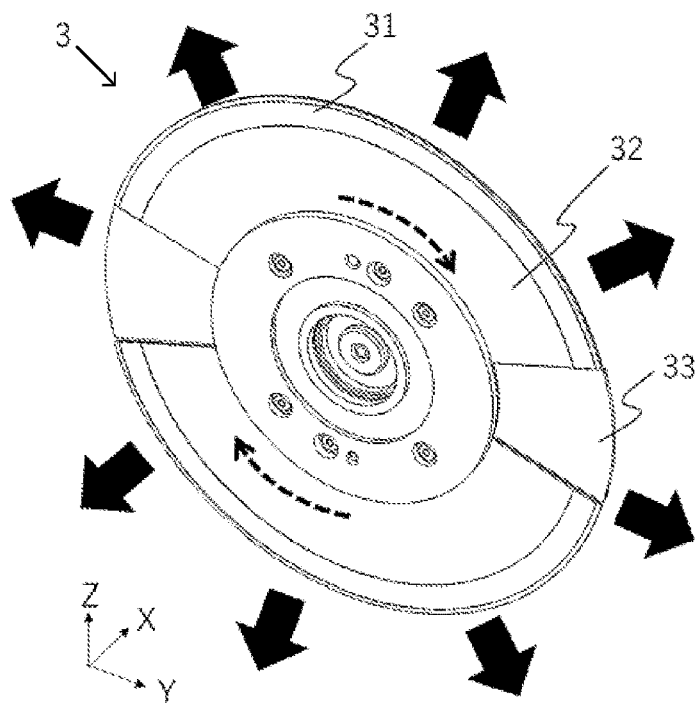
FIG. 4 illustrates a heat flow and a rotation direction of the fluorescent body unit according to the first embodiment.

FIG. 4 illustrates heat flows (thick arrows) from the fluorescent body wheel and the rotation direction (dashed arrow) of the fluorescent body wheel. Since the heat generated from the fluorescent body wheel moves in the direction orthogonal to the rotation center axis (X-axis) (direction on the YZ plane) due to the rotation of the fluorescent body wheel, an arc surface 351 is heated which is parallel to the rotation center axis of the fluorescent body wheel in the fluorescent body case 35 illustrated in FIG. 2.

As understood from FIGS. 1 and 2, since the second cooling air also hits the arc surface 351 where the temperature rises in the fluorescent body case 35, the cooling effect on the fluorescent body unit 3 can be enhanced.

Figure 5:
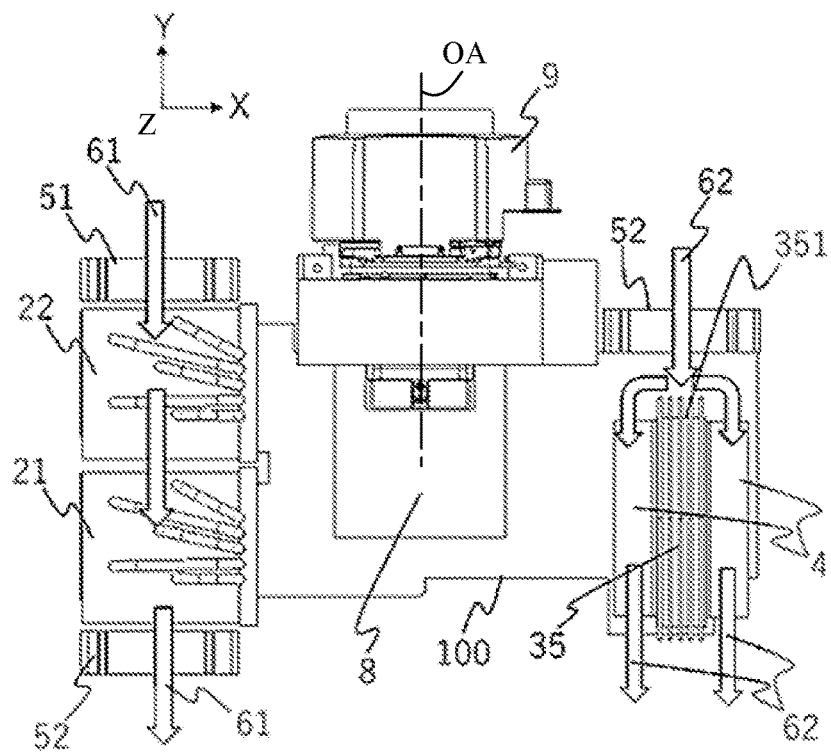
FIG. 5 is a plan view showing a configuration of an optical unit in a projector which includes the light source unit according to the first embodiment.
Figure 6:
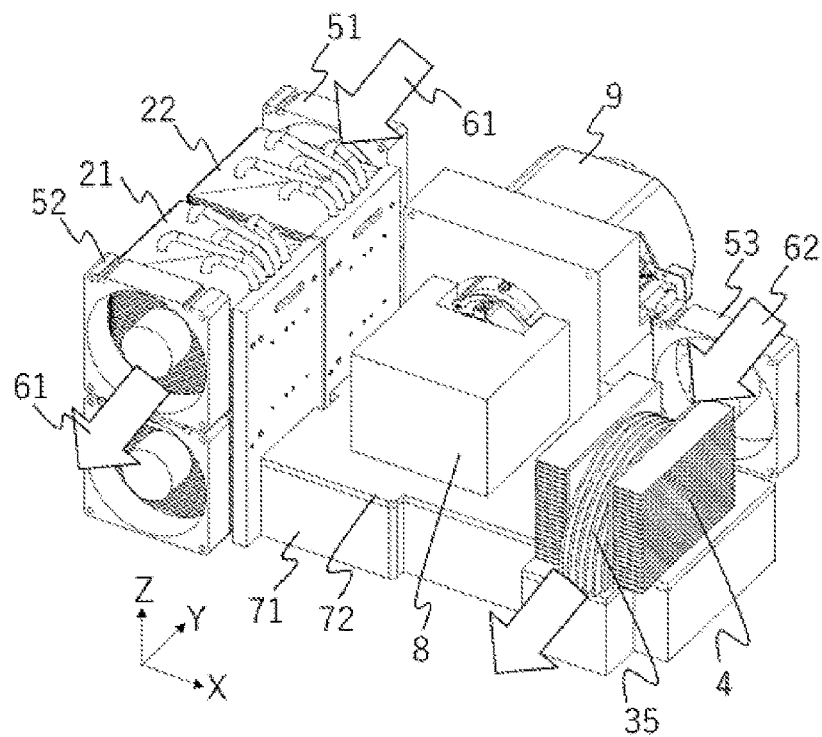
FIG. 6 is a perspective view of the optical unit in the projector according to the first embodiment.

FIGS. 5 and 6 illustrate the configuration of the optical unit of the projector as an image projection apparatus including the light source unit 100. These figures also illustrate the flowing directions 61 and 62 of the first cooling air and the second cooling air in the light source unit 100. As described above, the second cooling air flows along the fluorescent body heat sink 4 and the arc surface 351 of the fluorescent body case 35.

Illumination light (yellow light and blue light) emitted from the light source unit 100 enters an image generator 8. The image generator 8 converts the illumination light from the light source unit 100 into image light for projecting an image by modulating it with a light modulation element (not shown) according to a video signal input to the projector. The light modulation element can use a liquid crystal panel, a digital mirror device, or the like. The image light from the image generator 8 is enlarged and projected onto a projection surface such as a screen via a projection lens 9.

As illustrated in FIG. 5, the light source heat sink 2 and the fluorescent body heat sink 4, that is, the solid state light source 1 and the fluorescent body unit 3 are disposed on both sides of the projection lens 9 in the X direction orthogonal to the optical axis OA (both sides of the image generator 8).

Figure 7:
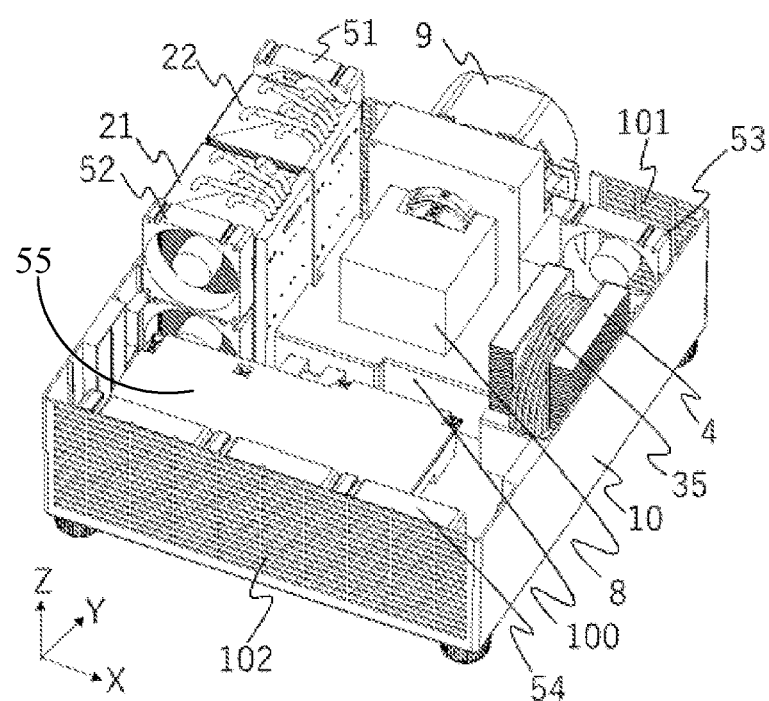
FIG. 7 is a rear perspective view showing a configuration inside a housing of the projector according to the first embodiment.
Figure 8:
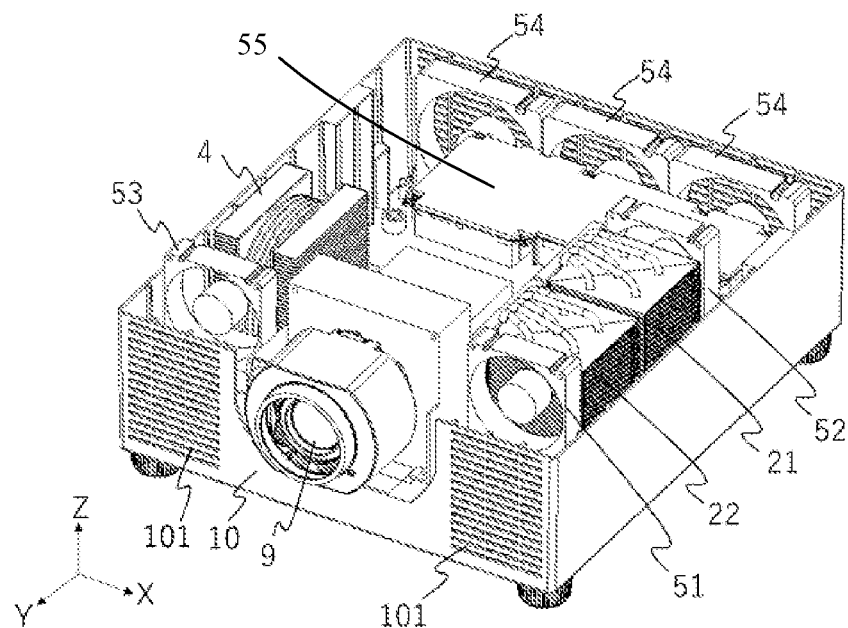
FIG. 8 is a front perspective view showing a configuration inside the housing of the projector according to the first embodiment.
Figure 9:
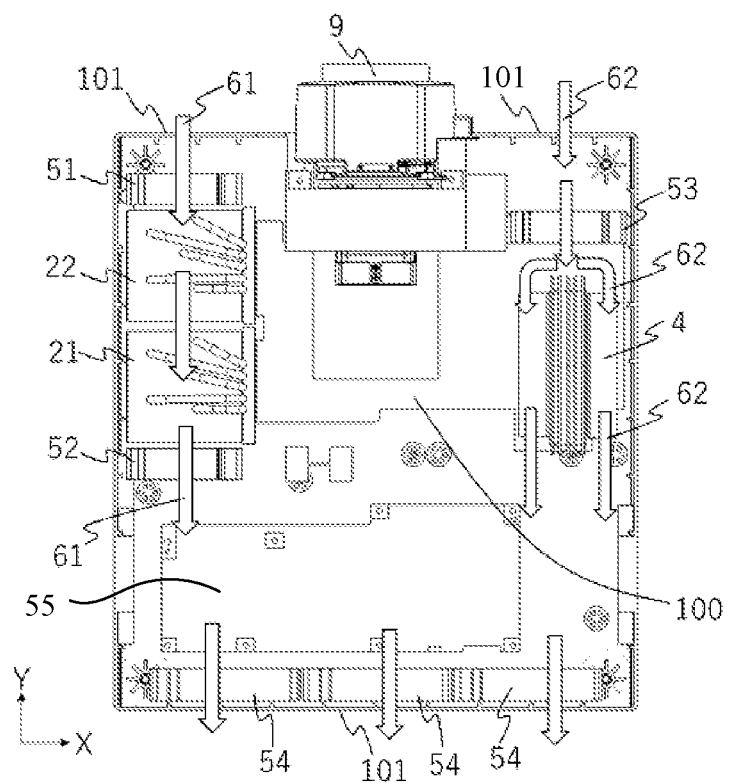
FIG. 9 illustrates a flow of cooling air in the projector according to the first embodiment.

FIGS. 7 and 8 illustrate the optical unit illustrated in FIGS. 5 and 6 housed inside a housing 10 (without an unillustrated upper cover). FIG. 9 illustrates the flows of the first and second cooling air in the housing 10.

On both sides of the projection lens 9 on the front surface of the housing 10 on the emission side (+Y side) of the image light from the projection lens 9, two intake ports 101 are provided for taking in outside air serving as the first and second cooling air, respectively. An exhaust port 102 is provided on the back surface of the housing 10 on the side opposite to the front surface. The emission direction (+Y direction) of the image light from the projection lens 9 and the flowing directions 61 and 62 of the first and second cooling air are opposite to each other. The first intake fan 51 and the second intake fan 53 described above are provided between the intake port 101 and each of the light source heat sink 2 and the fluorescent body heat sink 4.

The front surface of the housing 10 in this embodiment is a continuous flat surface, but may form discontinuous surfaces in which both sides of the projection lens 9 are inclined backward (−Y direction). In this case, the intake port is provided on each slope which is the surface on the emission side of the image light from the projection lens 9.

The above configuration can introduce the first and second cooling air having a temperature close to the outside air temperature to the light source heat sink 2 and the fluorescent body heat sink 4, and thus can improve the cooling efficiency. As described above, the solid state light source 1 and the fluorescent body unit 3 in the light source unit 100 are disposed on both sides of the projection lens 9 in the direction orthogonal to the optical axis OA. This configuration can dispose the projection lens 9 substantially at the center of the front surface of the housing 10, which is convenient for installing the projector. The intake port 101 provided on the surface on the emission side of the image light can restrain an obstacle that obstructs the intake from being disposed near the intake port 101.

An electric unit 55 including a power supply, a control board, and the like is disposed behind the first exhaust fan 52 in the housing 10, and three second exhaust fans 54 are disposed near the exhaust port 102 in the housing 10 behind it. The first cooling air that flows through the light source heat sink 2 and is blown out of the first exhaust fan 52 is exhausted to the outside of the housing 10 by the second exhaust fan 54 while part of the first cooling air cools the electric unit 55. The second exhaust fan 54 disposed near the exhaust port 102 can suppress the temperature rise in the housing 10 and reduce the ventilation resistance in the housing 10. Thereby, the cooling performance for the solid state light source 1 and the fluorescent body unit 3 can be improved. The intake port 101 and the exhaust port 102 provided on the front surface of the housing 10 and the back surface opposite to it can provide a linear flow of the first cooling air in order of the intake port 101, the light source heat sink 2, and the exhaust port 102, and a linear flow of the second cooling air in order of the intake port 101, the fluorescent body heat sink 4, and the exhaust port 102 independently in the same direction (−Y direction). Thereby, the flows of the first and second cooling air do not interfere with each other, so that the cooling performance for the solid state light source 1 and the fluorescent body unit 3 can be improved. Since both flows of the first and second cooling air are linear, the flow path resistance in the housing 10 can be reduced, and a decrease in flow rate and an increase in noise can be suppressed.

The exhaust port 102 and the intake port 101 provided on the front surface and the back surface can restrain the projectors from shielding the intake and exhaust when a plurality of projectors are stacked or arranged side by side to perform the stack projection or multi-projection.

As described above, this embodiment can improve the cooling performance for the solid state light source 1 and the fluorescent body 31, and realize a bright light source unit 100 having a long life and a projector having the same, each of which can restrain the brightness drop and the life shortage due to the temperature rise.

In this embodiment, the emission directions A11 and A12 of the laser beams from the first and second light sources 11 and 12 are parallel to each other, but as long as at least one emission direction and the incident direction A3 on the fluorescent body 31 are parallel to each other among the plurality of light sources, the condition is met in which the light source is disposed so as to face the fluorescent body. Even if the light receiving surface of the fluorescent body tilts to the light emitting surface of the light source, the light source may face the fluorescent body.

This embodiment uses the light source heat sinks 21 and 22 for cooling the solid state light source 1, but may use a liquid cooling system that circulates a liquid coolant to absorb and radiate the heat. The liquid cooling system has a jacket unit (heat absorption unit) that absorbs the heat from the light source, and a radiator unit (heat radiation unit) that radiates the heat from the jacket unit and is cooled by cooling air.

Second Embodiment

Figure 10:
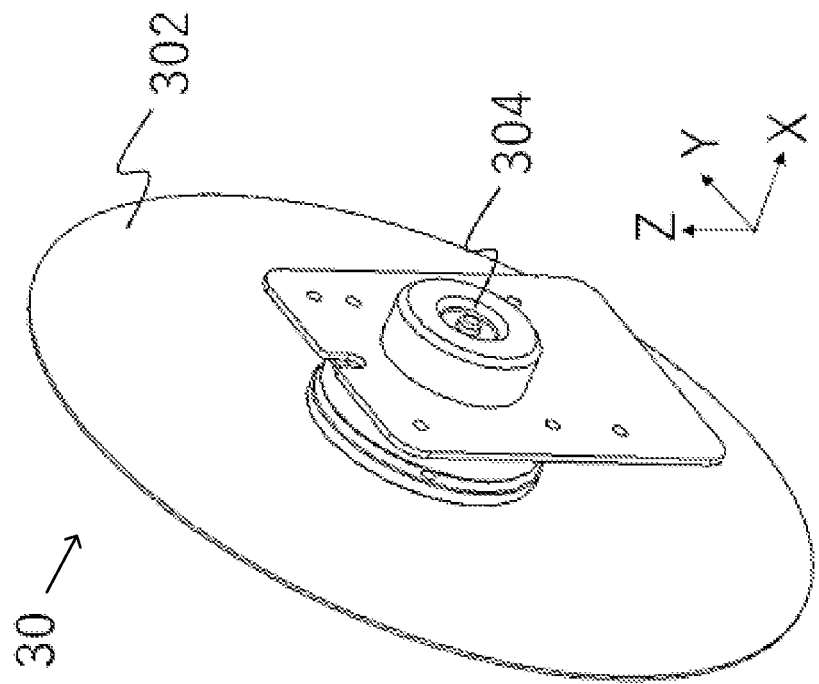
FIG. 10 is a perspective view showing a configuration of a fluorescent body unit in a light source unit according to a second embodiment.
Figure 10:
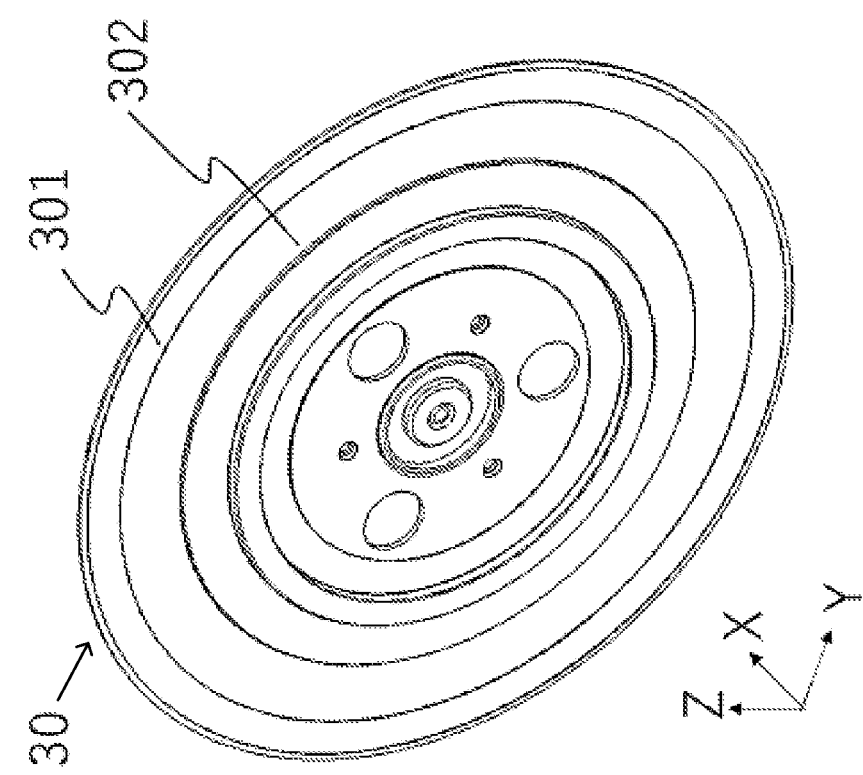

FIG. 10 illustrates a configuration of a fluorescent body unit 30 in a light source unit according to a second embodiment of the present invention. The configuration according to this embodiment other than the fluorescent body unit 30 is the same as that of the first embodiment.

The fluorescent body unit 30 includes a fluorescent body 301, a wheel 302, and a motor 304. The fluorescent body 301 (wavelength-)converts wavelength of part of blue light as excitation light into yellow light, and emits the yellow light and the blue light (non-converted light) that has not been wavelength-converted.

The fluorescent body 301 is coated in an annular shape on the wheel 302 made of a material having a high reflectance such as an aluminum material. The surface of the fluorescent body 301 is coated with a material in which a diffusing material for diffusing the non-converted light is mixed with a binder made of a resin material. The fluorescent body wheel includes the wheel 302 and the fluorescent body 301.

The fluorescent body wheel (301, 302) is rotated by the motor 304. The thus-configured fluorescent body unit 30 is fixed to the lid member of the optical system box and covered with the fluorescent body case, similar to the first embodiment. Similar to the first embodiment, the second cooling air flows along the fluorescent body case and the fluorescent heat sink adjacent to it, so that the fluorescent body unit 30 is cooled.

Third Embodiment

Figure 11:
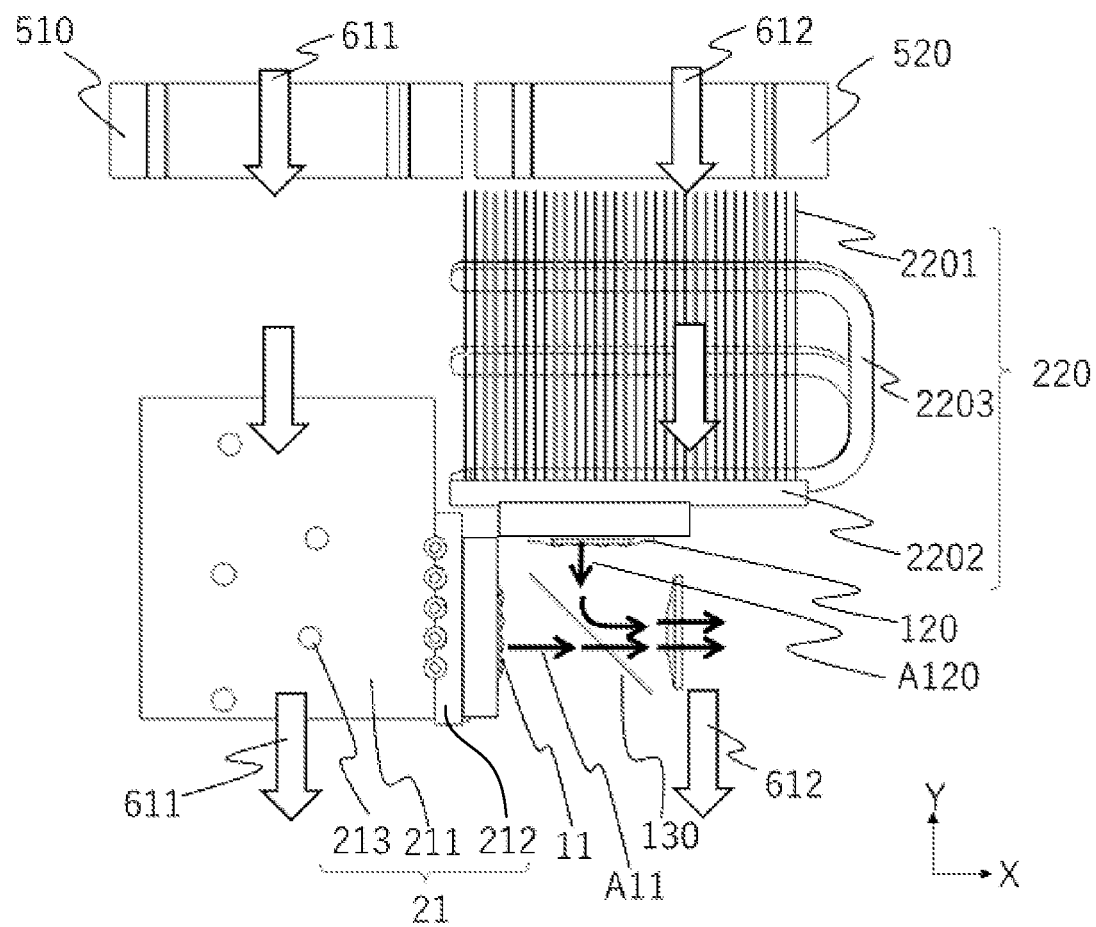
FIG. 11 illustrates a cooling structure of a laser beam source in a light source unit according to a third embodiment.

FIG. 11 illustrates the solid state light source 1 and its cooling structure in a light source unit according to a third embodiment of the present invention. The configuration of this embodiment other than part illustrated in FIG. 11 is the same as that of the first embodiment.

The solid state light source 1 has a first light source 11 and a second light source 120, each having a plurality of LDs that emit laser beams (blue light). In this embodiment, the first light source 11 emits the laser beam in the emission direction A11 in the +X direction, and the second light source 120 emits the laser beam in the emission direction A120 in the −Y direction. That is, the emission direction A11 of the laser beam from the first light source 11 and the emission direction A120 of the laser beam from the second light source 120 are orthogonal to each other. The emission directions A11 and A120 do not necessarily have to be orthogonal to each other.

The combining element 130 combines the laser beams emitted from the first light source 11 and the second light source 120. A transmission area and a reflection area provided with a reflection film are alternately provided on the combining element 130. The laser beam from the first light source 11 transmits the transmission area, and the laser beam from the second light source 120 is reflected in the reflection area and travels in the same direction (+X direction) as that of the laser beam from the first light source 11.

Arrows 611 and 612 indicate flowing directions of the first cooling air for cooling the first light source 11 and the second light source 120, respectively. The first cooling air from a first intake fan 510 is blown to the first light source heat sink 21 provided for the first light source 11. The first cooling air from another first intake fan 520 is blown to the second light source heat sink 220 provided for the second light source 12.

In the first light source heat sink 21, a plurality of fins 211 arranged in the Z direction are held by a base 212. In the second light source heat sink 220, a plurality of fins 2201 arranged in the X direction are held by a base 2202. The first and second light source heat sinks 21 and 220 have heat pipes 213 and 2203, respectively. The first light source heat sink 21 and the second light source heat sink 220 are the same components and are orientated different directions.

The first intake fan 510 is disposed on the +Y side of the first light source heat sink 21, which is the upstream side of the first cooling air, and blows the first cooling air in the −Y direction against the first light source heat sink 21. The first intake fan 520 is also disposed on the +Y side of the second light source heat sink 220, and blows the first cooling air against the second light source heat sink 220 in the −Y direction. The flowing directions 611 and 622 of the first cooling air toward the first light source heat sink 21 and the second light source heat sink 220 are the same −Y directions.

In the first light source heat sink 21, the first cooling air flowing in the −Y direction passes through the plurality of fins 211 and continues to flow in the −Y direction. In the second light source heat sink 220, the first cooling air flowing in the −Y direction passes through the plurality of fins 2201, then collides with the base 2202, and flows in the +Z direction and the −Z direction, and finally in the −Y direction.

This embodiment sets to a right angle the first angle formed between the flowing direction 611 of the first cooling air and the emission direction A11 of the laser beam from the first light source 11. A travelling direction of the combined light between the laser beam from the first light source 11 and the laser beam from the second light source 120 is parallel to the emission direction A11 of the laser beam from the first light source 11.

A direction orthogonal to the arrangement direction of the fins 211 in the first light source heat sink 21 (a direction in which each fin extends) and a direction orthogonal to the arrangement direction of the fins 2201 in the second light source heat sink 220 may tilt to the flowing directions 611 and 612 in a range that does not obstruct the flow of cooling air.

In each of the above embodiments, the fluorescent body wheel (wavelength conversion member) is rotated by the motor, but the wavelength conversion member does not have to be rotated. For example, if the laser beams from the plurality of LDs enter a plurality of areas in the wavelength conversion body, it is unnecessary to rotate the wavelength conversion member. In this case, a heat sink may be provided so that the heat from the substrate of the wavelength conversion member is transferred.

Each of the above embodiments uses a fluorescent body as the wavelength conversion body, but a wavelength conversion body other than the fluorescent body may be used.

Each embodiment can improve the cooling performance for the light source and the wavelength conversion body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-122866, filed on Jul. 17, 2020, which is hereby incorporated by reference herein in its entirety.

What is claimed is:

1. A light source apparatus comprising:
   a light source;
   a first heat radiation unit configured to radiate heat from the light source;
   a wavelength conversion element configured to convert the light from the light source into light with a different wavelength; and
   a second heat radiation unit configured to radiate heat from the wavelength conversion element,
   wherein the light source and the wavelength conversion element are disposed opposite to each other,
   wherein a flowing direction of first cooling air flowing through the first heat radiation unit and a flowing direction of second cooling air flowing through the second heat radiation unit are same direction to each other, and
   wherein a flow of the first cooling air is generated by a fan different from a fan that generates a flow of the second cooling air.

2. The light source apparatus according to claim 1, further comprising a plurality of light sources,
   wherein at least one of the plurality of light sources and the wavelength conversion element are disposed opposite to each other.

3. The light source apparatus according to claim 1, wherein an emission direction of the light from the light source and an incident direction of light on the wavelength conversion element are same direction to each other.

4. The light source apparatus according to claim 1, wherein an angle formed by the flowing direction of the first cooling air and an emission direction of light from the light source, and an angle formed by the flowing direction of the second cooling air and an incident direction of light from the light source onto the wavelength conversion element are equal to each other.

5. The light source apparatus according to claim 4, wherein each angle is a right angle.

6. The light source apparatus according to claim 1, wherein each of the first and second heat radiation units includes a plurality of fins arranged in a first direction and a base extending in a second direction orthogonal to the first direction and configured to hold the plurality of fins, and
   wherein the second direction is same direction to flowing directions of the first and second cooling air.

7. The light source apparatus according to claim 1, further comprising fans provided to the first and second heat radiation units on an upstream side and a downstream side of the first and second cooling air.

8. The light source apparatus according to claim 1, further comprising:
   a wavelength conversion member that includes the wavelength conversion element and a substrate configured to hold the wavelength conversion element;
   a motor configured to rotate the wavelength conversion member; and
   a cover member configured to cover the wavelength conversion member,
   wherein the second heat radiation unit is provided so that heat is transferred from the cover member.

9. The light source apparatus according to claim 1, further comprising a wavelength conversion member that includes the wavelength conversion element and a substrate configured to hold the wavelength conversion element,
   wherein the second heat radiation unit is provided so that heat is transferred from the substrate.

10. An image projection apparatus comprising:
    a light source apparatus;
    an image generator configured to modulate light emitted from the light source apparatus and to generate image light; and
    a projection lens configured to project the image light onto a projection surface to display the image,
    wherein the light source apparatus includes:
      a light source;
      a first heat radiation unit configured to radiate heat from the light source;
      a wavelength conversion element configured to convert the light from the light source into light with a different wavelength; and
      a second heat radiation unit configured to radiate heat from the wavelength conversion element,
    wherein the light source and the wavelength conversion element are disposed opposite to each other,
    wherein a flowing direction of first cooling air flowing through the first heat radiation unit and a flowing direction of second cooling air flowing through the second heat radiation unit are same direction to each other, and
    wherein a flow of the first cooling air is generated by a fan different from a fan that generates a flow of the second cooling air.

11. The image projection apparatus according to claim 10, wherein the light source and the wavelength conversion element are separated and disposed on both sides of a direction orthogonal to an optical axis of the projection lens.

12. The image projection apparatus according to claim 10, wherein an emission direction of the image light from the projection lens is opposite to each of flowing directions of the first and second cooling air.

13. The image projection apparatus according to claim 10, further comprising a housing configured to house the light source apparatus and the image generator, wherein a surface of the housing on a side where the image light is emitted from the projection lens has intake ports for taking in the first and second cooling air from outside.

14. The image projection apparatus according to claim 13, wherein a surface of the housing opposite to the surface on which the intake ports are provided has an exhaust port for exhausting the first and second cooling air to the outside.

* * * * *